United States Patent
Teraya

(10) Patent No.: US 9,925,885 B2
(45) Date of Patent: Mar. 27, 2018

(54) CONTROL SYSTEM FOR VEHICLE, VEHICLE, AND CONTROL METHOD FOR VEHICLE

(71) Applicant: Ryuta Teraya, Gotenba (JP)

(72) Inventor: Ryuta Teraya, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 474 days.

(21) Appl. No.: 14/423,247

(22) PCT Filed: Nov. 14, 2013

(86) PCT No.: PCT/IB2013/002532
§ 371 (c)(1),
(2) Date: Feb. 23, 2015

(87) PCT Pub. No.: WO2014/076542
PCT Pub. Date: May 22, 2014

(65) Prior Publication Data
US 2015/0210179 A1    Jul. 30, 2015

(30) Foreign Application Priority Data

Nov. 16, 2012    (JP) .................................. 2012-252407

(51) Int. Cl.
*B60L 11/18*    (2006.01)
*B60K 6/445*    (2007.10)
(Continued)

(52) U.S. Cl.
CPC .......... *B60L 11/1842* (2013.01); *B60K 6/445* (2013.01); *B60L 11/08* (2013.01);
(Continued)

(58) Field of Classification Search
CPC ............................ B60L 11/1842; B60L 1/006
See application file for complete search history.

(56) References Cited

U.S. PATENT DOCUMENTS 6,389,807 B1 *    5/2002    Suzuki ................... B60K 6/445
                                                    180/65.235
7,486,035 B2 *    2/2009    Oyobe .................. B60L 11/123
                                                    318/140

(Continued)

FOREIGN PATENT DOCUMENTS

CN    102092387 A    6/2011
JP    8-170540    7/1996

(Continued)

OTHER PUBLICATIONS

English Machine Translation of JP2008247252A published Oct. 16, 2008.*

*Primary Examiner* — Rexford Barnie
*Assistant Examiner* — David Shiao
(74) *Attorney, Agent, or Firm* — Finnegan, Henderson, Farabow, Garrett & Dunner, LLP

(57) ABSTRACT

A control system for a vehicle including an engine, an electrical storage unit and a generator driven by the engine, the control system includes a socket and a controller. The socket is configured to supply electric power from the generator or the electrical storage unit to a device outside the vehicle in a travel stop state. The controller stops the engine when a preset condition is satisfied. The controller sets a first range and a second range in which the condition is satisfied. The first range is the range in a case where electric power is supplied to the device outside the vehicle and the second range is the range in another case. The first range is narrower than the second range.

7 Claims, 7 Drawing Sheets

(51) Int. Cl.
  B60W 30/18 (2012.01)
  F02N 11/08 (2006.01)
  B60L 11/08 (2006.01)
  B60L 1/00 (2006.01)
  B60W 10/06 (2006.01)
  B60W 10/30 (2006.01)
  F02D 41/00 (2006.01)

(52) U.S. Cl.
  CPC .... B60L 11/1803 (2013.01); B60W 30/18054 (2013.01); F02N 11/084 (2013.01); F02N 11/0829 (2013.01); B60L 1/006 (2013.01); B60W 10/06 (2013.01); B60W 10/30 (2013.01); B60W 2550/12 (2013.01); B60W 2710/0688 (2013.01); F02D 41/005 (2013.01); F02N 2200/023 (2013.01); Y02T 10/48 (2013.01); Y02T 10/6239 (2013.01); Y02T 10/6269 (2013.01)

(56) References Cited

U.S. PATENT DOCUMENTS

| | | |
|---|---|---|
| 2005/0193747 A1* | 9/2005 | Kajimoto ............ B60H 1/00778 62/133 |
| 2010/0070123 A1 | 3/2010 | Itoh et al. |
| 2011/0139096 A1* | 6/2011 | Niimi ..................... B60K 6/445 123/2 |
| 2011/0178665 A1* | 7/2011 | Yoshioka .............. B60W 10/06 701/22 |
| 2014/0311426 A1 | 10/2014 | Yamazaki |

FOREIGN PATENT DOCUMENTS

| | | | |
|---|---|---|---|
| JP | 2008247252 A * | 10/2008 | ............. B60L 1/006 |
| JP | 2008-265682 | 11/2008 | |
| JP | 2010-112356 | 5/2010 | |
| JP | 2011-93491 | 5/2011 | |
| WO | WO 2013/080273 A1 | 6/2013 | |

* cited by examiner

CONTROL SYSTEM FOR VEHICLE, VEHICLE, AND CONTROL METHOD FOR VEHICLE

CROSS-REFERENCE TO RELATED APPLICATIONS

This application is a national phase application of International Application No. PCT/IB2013/002532, filed Nov. 14, 2013, and claims the priority of Japanese Application No. 2012-252407, filed Nov. 16, 2012, the content of both of which is incorporated herein by reference.

BACKGROUND OF THE INVENTION

1. Field of the Invention

The invention relates to a control system for a vehicle, a vehicle and a control method for a vehicle, which are able to supply electric power, to a device outside the vehicle.

2. Description of Related Art

Japanese Patent Application Publication No. 2008-265682 (JP 2008-265682 A) describes that a hybrid vehicle is controlled such that a required torque is output to a drive shaft while an engine undergoes intermittent stop operation when a battery temperature is higher than or equal to a threshold and an engine coolant temperature is higher than or equal to a threshold. Furthermore, JP 2008-265682 A describes that the hybrid vehicle is controlled such that a required torque is output to the drive shaft while intermittent stop operation of the engine is prohibited when the battery temperature is lower than the threshold and the engine coolant temperature is lower than the threshold.

SUMMARY OF THE INVENTION

In the control over the hybrid vehicle, described in JP 2008-265682 A, when electric power is supplied from an electrical storage unit to an electrical device, or the like, outside the vehicle, the engine is operated at a set low, speed during operation, which is different from operation of the engine when the hybrid vehicle is traveling. If an intermittent stop of the engine is prohibited when electric power is supplied to the device outside the vehicle in this way under the same condition as that when the vehicle is driven to travel, the temperature of the engine may be hard to rise. Therefore, the combustion efficiency of the engine may decrease, and fuel economy performance at the time when electric power is supplied to the device outside the vehicle may decrease.

The invention relates to a control system for a vehicle, a vehicle and a control method for a vehicle, which are able to improve fuel economy performance at the time when electric power is supplied to a device outside the vehicle.

A first aspect of the invention provides a control system for a vehicle that includes an engine, an electrical storage unit and a generator driven by the engine. The control system includes a socket and a controller. The socket is configured to supply electric power from the generator or the electrical storage unit to a device outside the vehicle in a travel stop state. The controller is configured to stop the engine when a preset condition is satisfied. The controller is configured to set a first range and a second range in which the condition is satisfied. The first range is the range in a case where electric power is supplied to the device outside the vehicle, and the second range is the range in a case other than the case where electric power is supplied to the device outside the vehicle. The controller is configured to set the first range in which the first range is narrower than the second range.

In the above control system, the condition may be satisfied when the coolant temperature is higher than or equal to a first threshold in a state other than a state where electric power is supplied to the device outside the vehicle, and the condition may not be satisfied when the coolant temperature is lower than the first threshold in the state other than the state where electric power is supplied to the device outside the vehicle.

In the above control system, the condition may be satisfied when the coolant temperature is higher than or equal to a second threshold that is set so as to be higher than the first threshold in the state where electric power is supplied to the device outside the vehicle, and the condition may not be satisfied when the coolant temperature is lower than the second threshold in the state where electric power is supplied to the device outside the vehicle.

In the above control system, the controller may be configured to prohibit operation of an exhaust gas recirculation device when the coolant temperature is lower than a third threshold.

In the above control system, the third threshold may be set so as to be higher than the first threshold and lower than the second threshold.

A second aspect of the invention provides a vehicle. The vehicle includes: an engine; an electrical storage unit; a generator that is configured to be driven by the engine; a socket that is configured to supply power from the generator or the electrical storage unit to a device outside the vehicle in a travel stop state; and a controller. The socket is configured to supply electric power from the generator or the electrical storage unit to a device outside the vehicle in a travel stop state. The controller is configured to stop the engine when a preset condition is satisfied. The controller is configured to set a first range and a second range in which the condition is satisfied. The first range is the range in a case where electric power is supplied to the device outside the vehicle, and the second range is the range in a case other than the case where electric power is supplied to the device outside the vehicle. The controller is configured to set the first range in which the first range is narrower than the second range.

A third aspect of the invention provides a control method for a vehicle. The control method includes: supplying electric power from a generator or an electrical storage unit to a device outside the vehicle when the vehicle is in a travel stop state; stopping the engine when a preset condition is satisfied; and setting a first range and a second range in which the condition is satisfied. The first range is the range in a case where electric power is supplied to the device outside the vehicle, the second range is the range in a case other than the case where electric power is supplied to the device outside the vehicle, and the first range is narrower than the second range.

With the control system for a vehicle, the vehicle and the control method for a vehicle, it is possible to keep the temperature of the engine high at the time when electric power is supplied to an external device, so it is possible to improve fuel economy performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
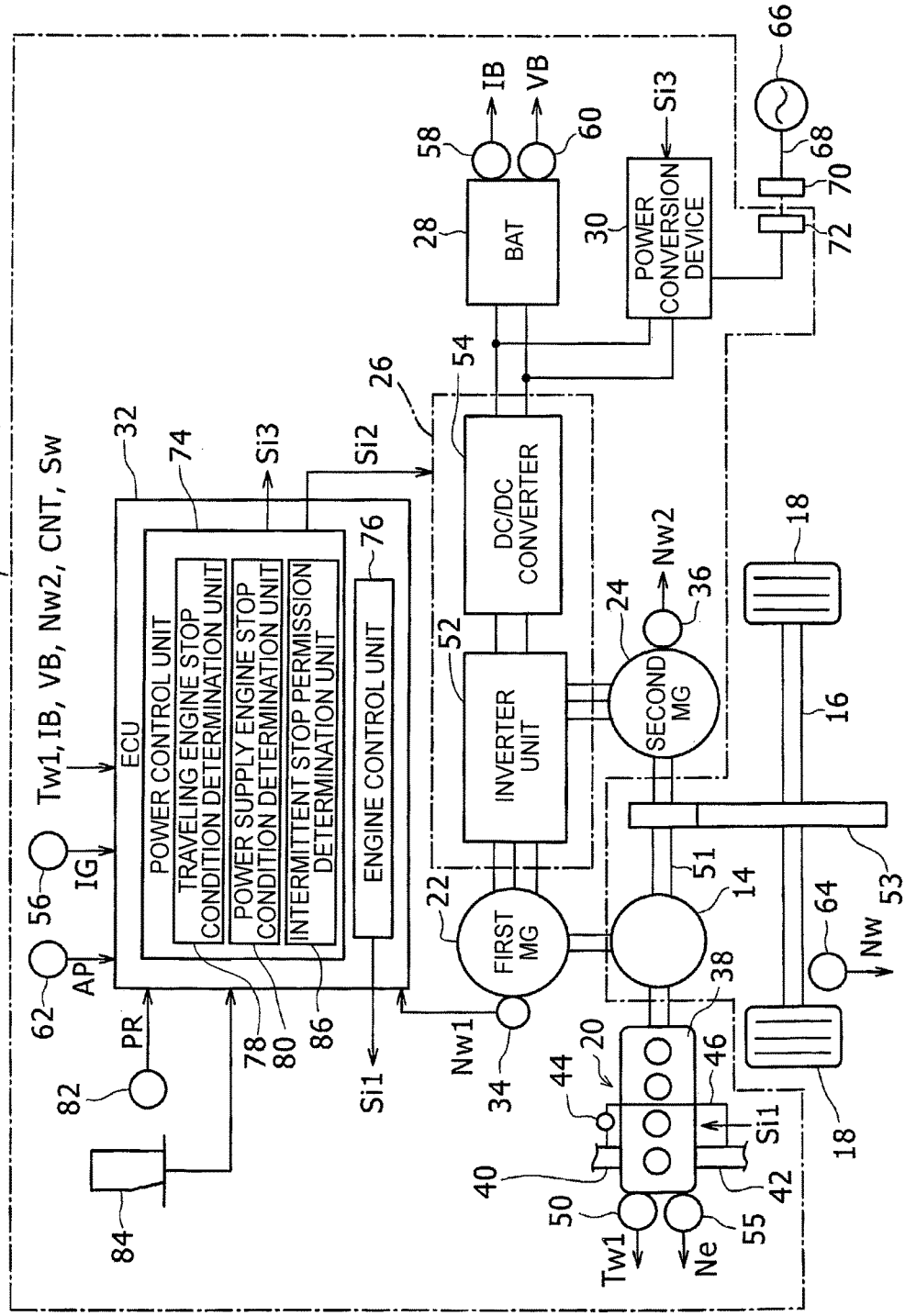
FIG. 1 is a schematic configuration view of a hybrid vehicle on which a control system according to an embodiment of the invention is mounted.

Hereinafter, an embodiment of the invention will be described with reference to the accompanying drawings. Hereinafter, description will be made on the case where each of a motor and a generator is a motor generator having both functions of a motor and a generator. However, this is only illustrative, and the invention is not limited to the present embodiment. For example, a first motor generator may be a mere generator, and a second motor generator may be a mere electric motor. In the following description, like reference numerals denote like elements in all the drawings.

FIG. 1 shows the schematic configuration of a hybrid vehicle 10 on which a control system 12 according to the present embodiment is mounted. FIG. 1 to FIG. 7 show an example of the embodiment of the invention.

The hybrid vehicle 10 includes the control system 12, a power split mechanism 14 and wheels 18 coupled to a drive shaft 16. The control system 12 includes an engine 20, a first motor generator 22, a second motor generator 24, a power control unit (PCU) 26, a battery 28, a power conversion device 30 and an electronic control unit (ECU) 32. The first motor generator 22 is driven by the engine 20, and is mainly used as a generator. The second motor generator 24 is mainly used as a drive motor. The battery 28 is an electrical storage unit. The ECU 32 is a controller. Hereinafter, the first motor generator 22 is referred to as the first MG 22, and the second motor generator 24 is referred to as the second MG 24.

The hybrid vehicle 10 may be a front-engine, front-wheel-drive (FF) layout vehicle, a front-engine, rear-wheel-drive (FR) layout vehicle, a four-wheel-drive (4WD) vehicle, or the like.

The first MG 22 is a three-phase motor, such as a three-phase synchronous motor. The first MG 22 is used as a motor for starting the engine 20. The first MG 22 is also used as a generator that is driven by the engine 20. In this case, at least part of torque from the engine 20 is transmitted to a rotary shaft of the first MG 22 via the power split mechanism 14. Electric power generated by the first MG 22 is supplied to the battery 28 via the PCU 26, and the battery 28 is charged. A first resolver 34 detects a rotation speed Nw1 of the first MG 22, and transmits a signal indicating the rotation speed Nw1 to the ECU 32.

The second MG 24 is a three-phase motor, such as a three-phase synchronous motor. The second MG 24 is driven by electric power supplied from the battery 28. The second MG 24 is used as a drive motor that generates driving force of the vehicle. The second MG 24 is also used as a generator, that is a device for regenerating electric power. Electric power generated by the second MG 24 is also supplied to the battery 28 via the PCU 26, and the battery 28 is charged. The first MG 22 and the second MG 24 undergo drive control executed by the PCU 26. A second resolver 36 detects a rotation speed Nw2 of the second MG 24, and transmits a signal indicating the rotation speed Nw2 to the ECU 32.

The engine 20 is an internal combustion engine, such as a gasoline engine and a diesel engine. The engine 20 is controlled by a control signal Si1 from the ECU 32. The engine 20 includes an intake passage 40, an exhaust passage 42 and an exhaust gas recirculation (EGR) device 44. The intake passage 40 and the exhaust passage 42 are connected to an engine body 38 including combustion chambers. The EGR device 44 includes an EGR valve provided in a return passage 46. The return passage 46 connects the intake passage 40 and the exhaust passage 42 to each other. The operation of the EGR device 44 is also controlled by the control signal Si1 from the ECU 32.

The engine 20 is cooled by coolant that circulates in a coolant passage (not shown). A coolant temperature sensor 50 detects a coolant temperature Tw1 that is the temperature of coolant of the engine 20. A signal indicating the detected coolant temperature Tw1 is transmitted to the ECU 32. An engine rotation speed sensor 55 detects a rotation speed Ne of a crankshaft of the engine. A signal indicating the detected rotation speed Ne is transmitted to the ECU 32.

The power split mechanism 14 is formed of a planetary gear mechanism. The planetary gear mechanism includes a sun gear, pinion gears, a carrier and a ring gear. For example, the sun gear is connected to an end portion of the hollow rotary shaft of the first motor generator 22. The carrier is connected to the drive shaft of the engine 20. The ring gear is connected to an output shaft 51. The output shaft 51 is connected to a rotary shaft of the second MG 24 directly or via a speed reducer, such as another planetary gear mechanism (not shown). The output shaft 51 is connected to the drive shaft 16 coupled to the wheels 18 via a speed reducer 53. The power split mechanism 14 distributes power from the engine 20 to a route to the output shaft 51-side drive shaft 16 and a route to the first MG 22.

The PCU 26 is connected between the battery 28 and both the first MG 22 and the second MG 24. The PCU 26 includes an inverter unit 52 and a DC/DC converter 54. The PCU 26 is controlled by a control signal Si2 from the ECU 32. The DC/DC converter 54 is a step-up/step-down converter that includes two serially connected switching elements, two diodes and a reactor. The switching elements each are formed of an insulated-gate bipolar transistor (IGBT), a transistor, or the like. The two diodes are respectively connected in antiparallel with the switching elements. One end of the reactor is connected between the switching elements. The DC/DC converter 54 is able to step up direct-current voltage supplied from the battery 28 and supply the stepped-up direct-current voltage to the inverter unit 52. The DC/DC converter 54 has the function of stepping down direct-current voltage supplied from the inverter unit 52 and supplying direct-current power to the battery 28, that is, charging the battery 28.

The inverter unit 52 includes a first inverter and a second inverter. The first inverter drives the first MG 22 by converting direct-current voltage, supplied from the DC/DC converter 54, to alternating-current voltage and supplying the alternating-current voltage to the first MG 22. The first inverter also has the function of converting alternating-current voltage, obtained through power generation when the first MG 22 generates electric power as the engine 20 is driven, to direct-current voltage and supplying the converted direct-current voltage to the DC/DC converter 54.

A second inverter drives the second MG 24 by converting direct-current voltage, supplied from the DC/DC converter 54, to alternating-current voltage and supplying the alternating-current voltage to the second MG 24. The second inverter also has the function of, at the time of regenerative braking of the hybrid vehicle 10, converting alternating-current voltage, generated by the second MG 24, to direct-current voltage and supplying the converted direct-current voltage to the DC/DC converter 54. Regenerative braking is carried out in a state where an accelerator pedal of the vehicle is not depressed and the state of charge of the battery 28 is low, and causes the second MG 24 to enter a regenerative braking state.

Each of the first inverter and the second inverter includes three-phase switching elements, and the switching operation of each switching element is controlled by the control signal Si2 from the ECU 32. The DC/DC converter 54 may be omitted from the PCU 26.

The battery 28 is a secondary battery, such as a nickel metal hydride battery and a lithium ion battery. A capacitor, or the like, may be used as the electrical storage unit. A system relay (not shown) is provided between the battery 28 and the DC/DC converter 54. The on/off operations of the system relay are controlled by the ECU 32. When an IG switch 56 that is a start-up switch (described later) is turned on by a user, the ECU 32 turns on the system relay. When the IG switch 56 is turned off, the system relay is turned off, and connection between the battery 28 and the inverter unit 52 is interrupted.

A current sensor 58 detects a current IB of the battery 28, and transmits a signal indicating the current IB to the ECU 32. A voltage sensor 60 detects a voltage VB of the battery 28, and transmits a signal indicating the voltage VB to the ECU 32. The ECU 32 calculates an SOC that is the state of charge of the battery 28 on the basis of one or both of the received current IB and voltage VB. A temperature sensor that detects the temperature of the battery 28 may be provided, and a signal indicating the detected temperature of the temperature sensor may be transmitted to the ECU 32.

An accelerator position sensor 62 detects an accelerator position AP of an accelerator pedal, and transmits a signal indicating the accelerator position AP to the ECU 32. A wheel speed sensor 64 detects a rotation speed Nw of one of the wheels 18, and transmits a signal indicating the rotation speed Nw to the ECU 32. The ECU 32 calculates a vehicle speed on the basis of the rotation speed Nw. The ECU 32 may calculate a vehicle speed on the basis of the detected rotation speed Nw2 of the second MG 24.

The power conversion device 30 includes a device that is able to bidirectionally convert direct current and alternating current to each other. The power conversion device 30 converts alternating-current power, supplied from an external power supply 66, to direct-current power, outputs direct-current power to the battery 28, and charges the battery 28. The power conversion device 30 also has the function of converting direct-current power of the battery 28 or direct-current power, generated by the first MG 22 that is driven by the engine 20 and supplied to the power conversion device 30 via the PCU 26, to alternating-current power for supplying electric power to a device outside the vehicle. The power conversion device 30 may be formed of a combination of an alternating-current output device that converts direct current to alternating current and a direct-current output device that converts alternating current to direct current. The power conversion device 30 is controlled by a control signal Si3 from the ECU 32.

The ECU 32 includes a microcomputer that has a central processing unit (CPU), a memory, and the like. In the example of the drawings, only one ECU 32 is shown as the ECU 32; instead, the ECU 32 may be formed of a plurality of split elements connected to each other via a signal cable as needed. The ECU 32 includes a power control unit 74 and an engine control unit 76. The power control unit 74 controls the PCU 26 and the power conversion device 30. The engine control unit 76 controls the engine 20. The power control unit 74 has a first determination unit 78, a second determination unit 80 and a third determination unit 86. The first determination unit (traveling engine stop condition determination unit) 78 determines whether a traveling engine stop condition is satisfied. The second determination unit (power supply engine stop condition determination unit) 80 determines whether a power supply engine stop condition is satisfied. The third determination unit (intermittent stop permission determination unit) 86 determines whether to permit an intermittent stop. These three determination units will be described in detail later.

The engine control unit 76 generates the control signal Si1 for controlling the engine 20, and outputs the control signal Si1 to the engine 20. The power control unit 74 generates the control signal Si2 for controlling the PCU 26, and outputs the control signal Si2 to the PCU 26. The power control unit 74 also generates the control signal Si3 for controlling the power conversion device 30, and outputs the control signal Si3 to the power conversion device 30.

The ECU 32 receives a signal IG from the IG switch 56 and a signal PR from a parking switch 82. The IG switch 56 is provided at a location at which the IG switch 56 is operable by a driver of the vehicle. The IG switch 56 is used to issue a start-up request and a stop request for the overall system of the vehicle. The IG switch 56 is formed of a push button, or the like, and is, for example, alternately switched between an on state and an off state by repeating pressing operation. The IG switch 56 generates the signal IG indicating states of the system, and transmits the signal IG to the ECU 32.

The parking switch 82 is a switch for setting a shift position to a parking position. When the parking switch 82 is operated, the parking switch 82 transmits the signal PR to the ECU 32. A push button type, a lever type, a rotary type, or the like, may be employed as the type of parking switch 82.

When the ECU 32 receives the signal PR and the shift position is a non-parking position, the shift position is switched to the parking position. In this case, the ECU 32 executes control such that a lock gear (not shown) fixed to the output shaft 51 is fixed by an engaging member (not shown) by driving a parking lock device (not shown) and thus the output shaft 51 is fixed. In this case, movement of the vehicle is inhibited.

A shift lever 84 allows shift positions other than the parking position to be manually set. A signal indicating operation of the shift lever 84 is also transmitted to the ECU 32. The parking position is released by operating the shift lever 84.

During traveling drive control, the power control unit 74 calculates a vehicle target torque Tr* and an engine target power Pe* on the basis of the accelerator position AP. The vehicle target torque Tr* may be calculated on the basis of the vehicle speed and the accelerator position AP. The engine target power Pe* may be calculated on the basis of the rotation speed of the ring gear, obtained from the vehicle speed or the rotation speed Nw2 of the second MG, a charge/discharge required amount of the battery 28 and the vehicle target torque Tr*. The charge/discharge required amount of the battery 28 can be calculated on the basis of the temperature, SOC, and the like, of the battery 28. The power control unit 74 calculates a target rotation speed Ne* and target torque Te* of the engine 20 on the basis of the engine target power Pe* by consulting a preset engine high-efficiency map.

The power control unit 74 calculates the target rotation speed Nw1* of the first MG 22 on the basis of the target rotation speed Ne*, the rotation speed Nw2 of the second MG 24 and a gear ratio ρ of the power split mechanism 14, and calculates a target torque Tr1* of the first MG 22 on the basis of the target rotation speed Nw1* and the rotation speed Nw1 of the first MG 22. The power control unit 74 calculates a target torque Tr2* of the second MG 24 on the basis of the vehicle target torque Tr*, the target torque Tr1* of the first MG 22 and the gear ratio ρ of the power split mechanism 14. The target rotation speed Ne* and target torque Te* of the engine 20, the target rotation speed Nw1* and target torque Tr1* of the first MG 22, and the target torque Tr* of the second MG 24 may be calculated on the basis of the accelerator position AP or on the basis of the accelerator position AP and the vehicle speed by consulting a map prestored in a storage unit (not shown).

The power control unit 74 outputs the calculated target rotation speed Ne* and target torque Te* of the engine 20 to the engine control unit 76. The engine control unit 76 controls the engine 20 by the control signal Si1 such that the target rotation speed Ne* and the target torque Te* are obtained. The power control unit 74 controls the first MG 22 and the second MG 24 by the control signal Si2 such that the calculated target rotation speed Nw1* and target torque Tr1* of the first MG 22 and the target torque Tr* of the second MG 24 are obtained.

The power control unit 74 may be split to an overall control unit that executes integrated control over the entire system called hybrid ECU and a motor control unit that controls the PCU 26, and the overall control unit, the motor control unit and the engine control unit 76 may be connected to one another via a signal cable. In this case, a target power for the entire vehicle is calculated by the overall control unit, the overall control unit outputs the calculated target torque Tr1* of the first MG 22, the calculated target torque Tr2* of the second MG 24 and the calculated target rotation speed Nw1* of the first MG 22 to the motor control unit, and outputs the calculated target torque Te* and target rotation speed Ne* of the engine 20 to the engine control unit 76. In this case, the motor control unit outputs the control signal Si2 to the PCU 26, and the engine control unit outputs the control signal Si1 to the engine 20.

The first determination unit 78 that determines a traveling engine stop condition in the power control unit 74 determines whether the traveling engine stop condition including a preset intermittent stop permission condition is satisfied when the vehicle is driven to travel. As a result, when it is determined that the traveling engine stop condition is satisfied, the power control unit 74 transmits a signal indicating that the traveling engine stop condition is satisfied to the engine control unit 76, and the engine control unit 76 stops the engine 20. The engine 20 is stopped for only a period of time during which the traveling engine stop condition is satisfied, and the engine 20 is alternately operated or stopped repeatedly. Thus, intermittent stop operation of the engine 20 is carried out.

The traveling engine stop condition is satisfied when all the following conditions are satisfied: (1) travel drive control is permitted to be executed, (2) the engine 20 is being operated, (3) an intermittent stop permission condition (described later) is satisfied, (4) the calculated target power Pe* of the engine 20 is smaller than or equal to a preset predetermined power Pw1, and (5) the calculated SOC of the battery 28 is higher than or equal to a preset predetermined value SO1. When at least any one of these conditions (1) to (5) is not satisfied, the traveling engine stop condition is not satisfied. When it is determined that the traveling engine stop condition is satisfied, the ECU 32 permits a stop of the engine 20 when the intermittent stop permission condition is satisfied. The intermittent stop permission condition includes a condition that the coolant temperature Tw1 of the engine 20, detected by the coolant temperature sensor 50, is higher than or equal to a preset first threshold B° C. (Tw1≥B). The first threshold B of the coolant temperature is set such that an intermittent stop time of the engine 20 is shorter than or equal to a set period of time and the efficiency at the time of a restart of the engine 20 does not excessively decrease. The first threshold B of the coolant temperature is set to a somewhat low value in order to improve fuel economy by expanding an intermittent stop permission region.

The ECU 32 calculates the target torque Tr2 of the second MG 24 under the condition that the target torque Tr1* of the first MG 22 is 0 when the engine 20 is stopped, and controls the second MG 24 such that the second MG 24 is driven at the target torque Tr2*.

On the other hand, when it is determined that the traveling engine stop condition is not satisfied, the ECU 32 does not permit a stop of the engine 20. For example, when the coolant temperature Tw1 of the engine 20 is lower than the first threshold B° C. (Tw1<B), an intermittent stop of the engine 20 is not permitted. In this case, when the engine 20 is being operated, the ECU 32 prohibits an intermittent stop of the engine 20 and controls the engine 20 such that the engine 20 is driven at the target torque Te* and the target rotation speed Ne*. When the engine is being started or when the target power Pe* of the engine 20 is larger than a preset predetermined power Pw2 for starting the engine 20 when the engine 20 is stopped, the ECU 32 executes control such that the engine 20 is started.

Figure 2:
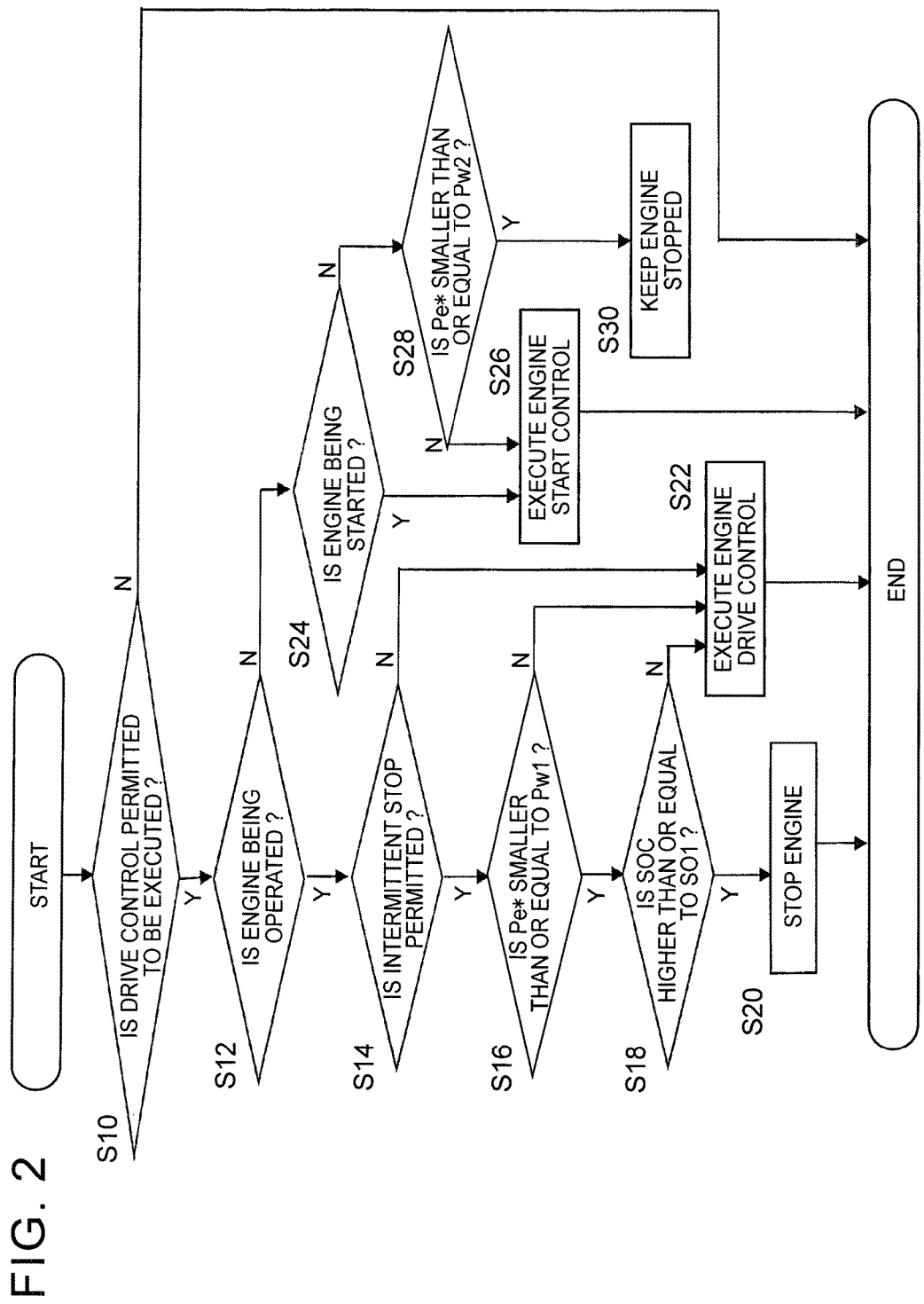
FIG. 2 is a flowchart that shows a control method for an engine during traveling in the control system shown in FIG. 1.

FIG. 2 is a flowchart that shows a control method for the engine 20 during traveling in the control system shown in FIG. 1. A control routine shown in FIG. 2 is executed by the ECU 32 at predetermined intervals. In step S10 (hereinafter, step S is simply referred to as S), the ECU 32 determines whether drive control is permitted to be executed on the basis of the vehicle speed, the detected accelerator position AP, and the like. When the ECU 32 determines in S10 that drive control is permitted to be executed, the ECU 32 proceeds with the process to S12, and determines whether the engine 20 is being operated. When the ECU 32 determines in S12 that the engine 20 is being operated, the ECU 32 proceeds with the process to S14. When the ECU 32 determines in S14 that the intermittent stop permission condition including the condition that the coolant temperature Tw1 is higher than or equal to the first threshold B° C. is satisfied, the ECU 32 proceeds with the process to S16. When the ECU 32 determines in S16 that the target power Pe* of the engine 20 is smaller than or equal to the predetermined power Pw1, the ECU 32 proceeds with the process to S18. When the ECU 32 determines in S18 that the calculated SOC is higher than or equal to a predetermined value SO1, the ECU 32 proceeds with the process to S20, and controls the engine 20 such that the engine 20 is stopped.

On the other hand, when the ECU 32 determines in S14 that the intermittent stop permission condition is not satisfied or determines in S16 that the target power Pe* of the engine 20 is not smaller than or equal to the predetermined power Pw1 or determines in S18 that the calculated SOC is not higher than or equal to the predetermined value SO1, the ECU 32 proceeds with the process to S22 in any one of the cases. The ECU 32 controls the engine 20 in S22 such that the engine 20 is driven at the target torque Te* and the target rotation speed Ne*.

When the ECU 32 determines in S12 that the engine 20 is not being operated, the ECU 32 proceeds with the process to S24. The ECU 32 determines in S24 whether the engine 20 is being started. When the ECU 32 determines in S24 that the engine 20 is being started, the ECU 32 proceeds with the process to S26, and executes starting control over the engine 20. On the other hand, when the ECU 32 determines in S24 that the engine 20 is not being started, the ECU 32 proceeds with the process to S28, and determines whether the target power Pe* of the engine 20 is smaller than or equal to the predetermined power Pw2. When the ECU 32 determines in S28 that the target power Pe* of the engine 20 is not smaller than or equal to the predetermined power Pw2, the ECU 32 proceeds with the process to S26, and executes starting control over the engine 20. On the other hand, when the ECU 32 determines in S28 that the target power Pe* of the engine 20 is smaller than or equal to Pw2, the ECU 32 proceeds with the process to S30, and keeps the engine 20 stopped. When any one of controls in S20, S22, S26 is executed, the ECU 32 controls the first MG 22 and the second MG 24 such that the second MG 24 is driven at the calculated target torque Tr2* or, in addition to this, the first MG 22 is driven at the calculated target rotation speed Nw1* and target torque Tr1*. The predetermined power Pw2 used to determine whether to start the engine 20 may be set so as to be larger than the predetermined power Pw1 used to determine whether to stop the engine 20 during operation of the engine 20. When the predetermined power Pw2 is set so as to be larger than the predetermined power Pw1, frequent repetition of stop and start of the engine 20 is suppressed.

Figure 3:
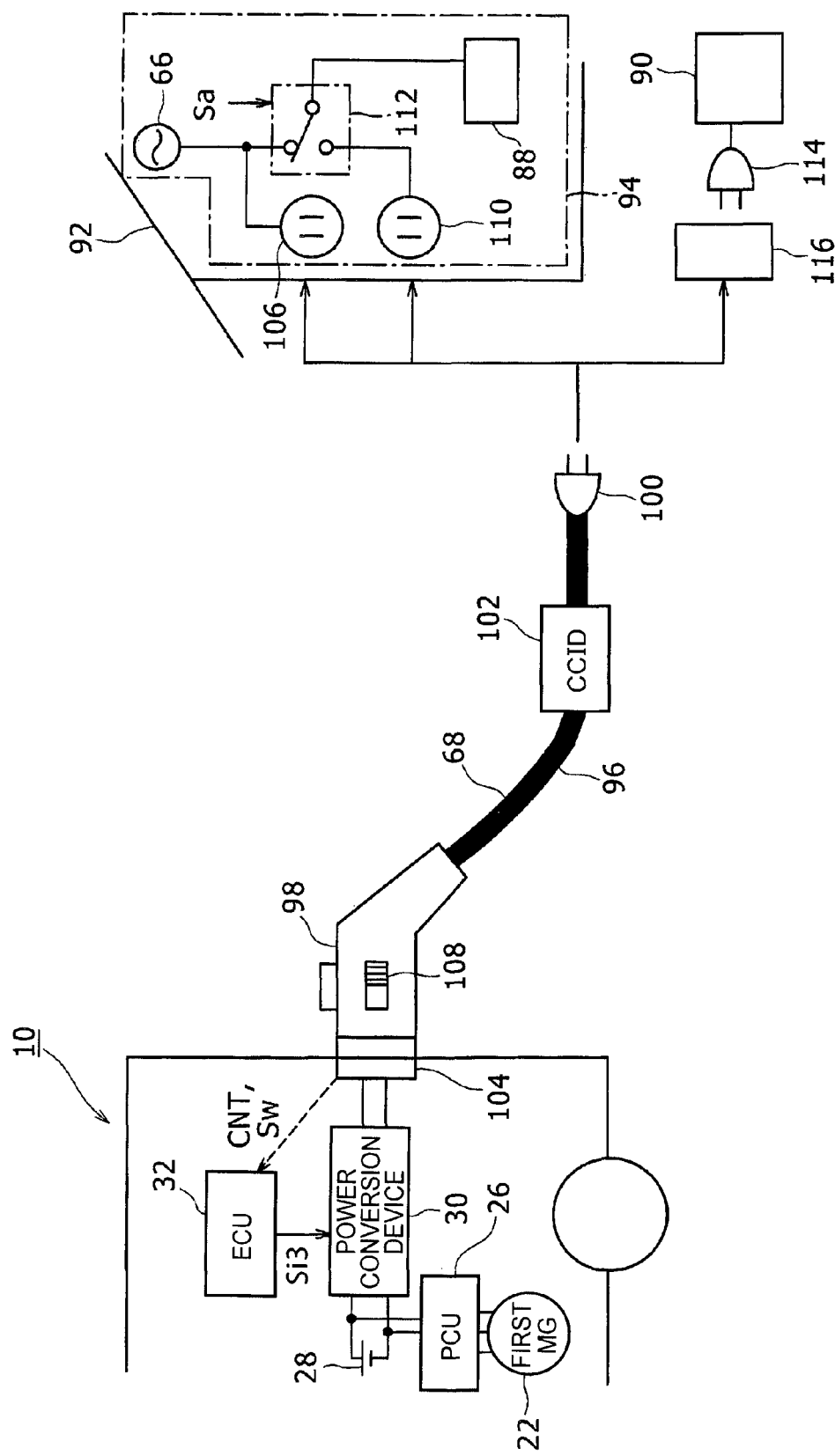
FIG. 3 is a, schematic view that shows a configuration example in which the vehicle shown in FIG. 1 and an external power supply device are connected by a power cable and any one of operation to charge the vehicle and operation to supply electric power to a device outside the vehicle is carried out.

As shown in FIG. 3, the hybrid vehicle 10 is selectively able to charge the battery 28 from, the external power supply 66 outside the vehicle in a travel stop state or supply electric power from the first MG 22 or the battery 28 to an electrical device 88 or electrical device 90 outside the vehicle.

FIG. 3 is a schematic view that shows a configuration example in which the vehicle shown in FIG. 1 and a power supply device 94 of a house 92 that is a building are connected by a power cable 68 and any one of operation to charge the vehicle and operation to supply electric power to the device outside the vehicle is carried out. The building may be another building, such as a hospital, other than the house 92. As shown in FIG. 3, the power cable 68 includes a connector 98, a plug 100 and a charging circuit interrupt device (CCID) 102. The connector 98 and the plug 100 are respectively provided at both end portions of a power line 96. The CCID 102 is provided in the middle of the power line 96. The CCID 102 has a circuit having the function of switching between supply of electric power from the external power supply 66 to the vehicle and interruption of the supply. The connector 98 is connected to a socket 104 provided at the vehicle when the battery 28 is charged or when electric power is supplied to the device outside the vehicle. When the battery 28 is charged, the plug 100 is connected to the external power supply 66, which is a commercial alternating-current power supply, via a socket 106 provided at the house 92.

The connector 98 has a switch 108 that is operable by the user. The switch 108 also has a mechanism for detaching the connector 98 from the socket 104. The switch 108 also has the function of switching between operation to charge the battery 28 and operation to supply electric power to the device outside the vehicle by switching the position of the switch 108. The connector 98 transmits a signal CNT indicating connection of the connector 98 to the socket 104 from the socket 104 to the ECU 32 when the connector 98 is connected to the socket 104.

When operation to supply electric power to the device outside the vehicle is selected by the switch 108, the connector 98 transmits a signal SW to the ECU 32. The ECU 32 determines whether a shifting condition into an external power supply state including a state where operation to supply electric power to the device outside the vehicle is selected on the basis of whether there is the signal SW. When the ECU 32 determines that the shifting condition into the state where electric power is supplied to the device outside the vehicle is satisfied, the ECU 32 supplies electric power from the first MG 22 or the battery 28 to the electrical device 88 in the house 92 outside the vehicle. The ECU 32 determines through the process of the flowchart shown in FIG. 4 whether the shifting condition into the state where electric power is supplied to the device outside the vehicle is satisfied.

Figure 4:
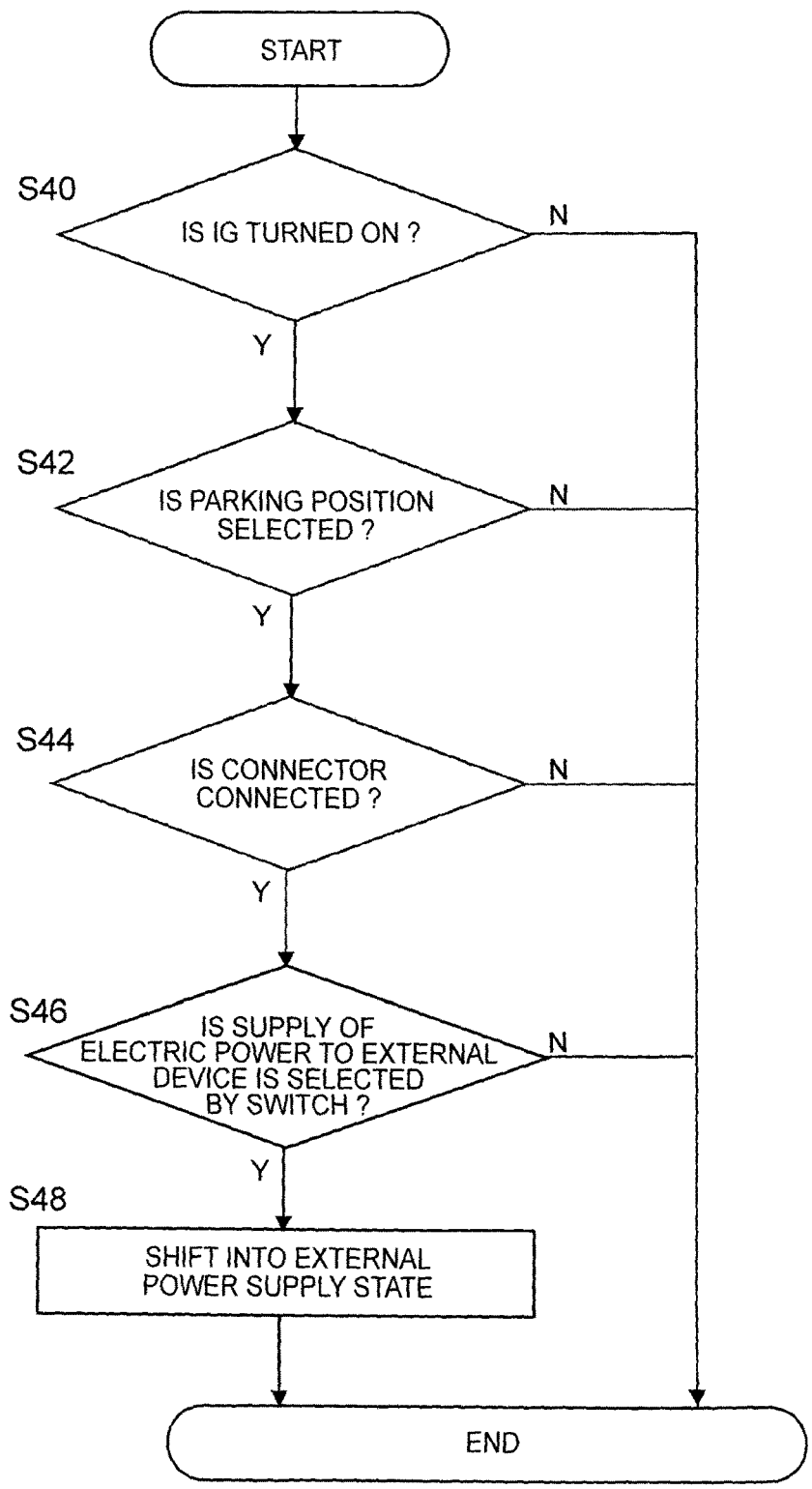
FIG. 4 is a flowchart that shows a method of determining whether a condition for shifting into a state where electric power is supplied to the device outside the vehicle is satisfied in the control system shown in FIG. 1.

FIG. 4 is a flowchart that shows a method of determining whether the shifting condition into the state where electric power is supplied to the device outside the vehicle is satisfied in the control system 12 shown in FIG. 1. A routine shown in FIG. 4 is executed by the ECU 32 at predetermined intervals. In step S40, the ECU 32 determines whether the signal IG is turned on. That is, the ECU 32 determines in step S40 whether the IG switch 56 is turned on and important elements of the system have a malfunction. When it is determined that the signal IG is turned on, the ECU 32 proceeds with the process to S42. On the other hand, when the signal IG is turned off, the ECU 32 returns the process to a main routine.

In S42, the ECU 32 determines whether the parking position is selected on the basis of the signal PR. When the parking position is selected, the ECU 32 proceeds with the process to S44; whereas, when the parking position is not selected, the ECU 32 returns the process to the main routine.

In S44, the ECU 32 determines whether the connector 98 of the power cable 68 is connected to the socket 104 of the vehicle in a state where the plug 100 provided at the power cable 68 is connected to the socket 110 provided at the house 92 on the basis of the signal CNT. When the ECU 32 determines that the connector 98 is connected to the socket 104, the ECU 32 proceeds with the process to S46; whereas, when the ECU 32 determines that the connector 98 is not connected to the socket 104, the ECU 32 returns the process to the main routine. The socket 110 is connected to the electrical device 88 in the house 92 via a switch 112. The electrical device 88 is connected to the switch 112 by connecting the electrical device 88 to a wall outlet (not shown). The switch 112 switches such that the electrical device 88 is connected to the socket 110 upon detection of an interruption detection signal Sa.

In S46, the ECU 32 determines whether operation to supply electric power to the device outside the vehicle is selected by the switch 108 of the connector 98 on the basis of the signal SW. When operation to supply electric power to the device outside the vehicle is selected, the ECU 32 proceeds with the process to S48, and determines that the shifting condition into the state where electric power is supplied to the device outside the vehicle is satisfied. On the other hand, when the ECU 32 determines in S46 that operation to supply electric power to the device outside the vehicle is not selected, the ECU 32 returns the process to the main routine.

When the ECU 32 determines that the shifting condition into the state where electric power is supplied to the device outside the vehicle is satisfied, the ECU 32 controls the engine 20 such that the engine 20 is driven for rotation at a set rotation speed and the first MG 22 generates electric power. Together with this, the ECU 32 controls the power conversion device 30 by the control signal Si3 such that electric power generated by the first MG 22 is supplied to the device outside the vehicle via the power cable 68.

The second determination unit 80 of the ECU 32, which determines a power supply engine stop condition, determines whether a power supply engine stop condition including the preset intermittent stop permission condition in a travel stop state of the vehicle is satisfied. As a result, when it is determined that the power supply engine stop condition is satisfied, the power control unit 74 transmits the signal indicating that the power supply engine stop condition is satisfied to the engine control unit 76, and the engine control, unit 76 stops the engine 20. The engine 20 is stopped for only a period of time during which the power supply engine stop condition is satisfied, and intermittent stop operation of the engine 20 is carried out by alternately operating or stopping the engine 20 repeatedly.

The power supply engine stop condition is satisfied when all the following conditions are satisfied: (1) it is determined to be in the state where electric power is supplied to the device outside the vehicle, (2) the intermittent stop permission condition (described later) is satisfied, and (3) the calculated SOC of the battery 28 is higher than or equal to a preset predetermined value SO2. When at least any one of these conditions (1) to (3) is not satisfied, the power supply engine stop condition is not satisfied. When it is determined that the power supply engine stop condition is satisfied as well, a stop of the engine 20 is permitted when the intermittent stop permission condition is satisfied as in the case where it is determined that the traveling engine stop condition is satisfied. The intermittent stop permission condition includes a condition that the coolant temperature Tw1 detected by the coolant temperature sensor 50 is higher than or equal to a preset second threshold A° C. (Tw1≥A). The second threshold A of the coolant temperature is set such that the intermittent stop time of the engine 20 is shorter than or equal to a set period of time and the efficiency at the time of a restart of the engine 20 does not excessively decrease.

On the precondition that the intermittent stop permission condition is satisfied, when a preset predetermined period of time has elapsed from a restart of the engine 20 or when the coolant temperature Tw1 has increased by a preset predetermined temperature, the engine 20 may be controlled so as to be stopped.

When the engine 20 is stopped, the power control unit 74 controls the power conversion device 30 by outputting the control signal Si3 to the power conversion device 30 such that electric power from the battery 28 is output to the power cable 68 via the power conversion device 30.

On the other hand, when it is determined that the power supply engine stop condition is not satisfied, the ECU 32 does not stop the engine 20. For example, when the coolant temperature of the engine 20 is lower than the second threshold A° C., an intermittent stop of the engine 20 is not permitted. In this case, the ECU 32 prohibits an intermittent stop of the engine 20, and controls the engine 20 such that the engine 20 is restarted when the engine 20 is stopped or the engine 20 is continuously driven at a set rotation speed when the engine 20 is being operated. Within electric power generated by the first MG 22 while the engine 20 is driven, redundant electric power that is not consumed by the external electrical device 88 is used to charge the battery 28. Thus, the SOC of the battery 28 may gradually increase while the engine 20 is driven.

The predetermined value SO2 for determining whether the power supply engine stop condition is satisfied when electric power is supplied to the device outside the vehicle may be set so as to be higher than the predetermined value SO1 for determining whether the traveling engine stop condition is satisfied (SO2>SO1).

The ECU 32 stops the engine 20 when the power supply engine stop condition is satisfied at the time when electric power is supplied to the device outside the vehicle. At this time, the range (the first range) in which the intermittent stop permission condition is satisfied in a case where electric power is supplied to the device outside the vehicle is set so as to be narrower than the range (the second range) in which the intermittent stop permission condition is satisfied in a case including a case where the vehicle is driven to travel, that is, a case other than the case where electric power is supplied to the device outside the vehicle, and an intermittent stop of the engine 20 is hard to be permitted. Specifically, the second threshold A° C. of the coolant temperature is set so as to be higher than the first threshold B° C. of the coolant temperature, which is used to determine whether the intermittent stop permission condition is satisfied during traveling. For example, the first threshold B° C. is 40° C., and the second threshold A° C. is 80° C.

More specifically, the intermittent stop permission condition is set so as to be satisfied when the coolant temperature Tw1 is higher than or equal to the first threshold B° C. in the case where it is not in the state where electric power is supplied to the device outside the vehicle, for example, the case where the vehicle is driven to travel; whereas the intermittent stop permission condition is set so as to be not satisfied when the coolant temperature Tw1 is lower than the first threshold B° C. in the same case. In addition, the intermittent stop permission condition is set so as to be satisfied when the coolant temperature Tw1 is higher than or equal to the second threshold A° C. that is set so as to be higher than the first threshold B° C. in the case where electric power is supplied to the device outside the vehicle; whereas the intermittent stop permission condition is set so as to be not satisfied when the coolant temperature Tw1 is lower than the second threshold A° C. in the same case. Thus, only when the coolant temperature Tw1 is higher than or equal to the second threshold A° C. higher than the first threshold B° C. at the time when the vehicle is driven to travel in a state where electric power is supplied to the device outside the vehicle, an intermittent stop of the engine 20 is permitted.

The third determination unit 86 of the power control unit 74, which determines whether to permit an intermittent stop prohibits an intermittent stop of the engine 20 in any one of the case (1) where electric power is supplied to the device outside the vehicle and it is determined that the coolant temperature Tw1 is lower than the second threshold A° C. and the case (2) where electric power is not supplied to the device outside the vehicle and it is determined that the coolant temperature Tw1 is lower than the first threshold B° C., irrespective of whether another condition is satisfied. The ECU 32 determines whether the coolant temperature Tw1 is lower than a preset third threshold C° C. after determination of the third determination unit 86 that determines whether to permit an intermittent stop. When it is determined that the coolant temperature Tw1 is lower than the third threshold C° C., the ECU 32 prohibits operation of the EGR device 44. On the other hand, when it is determined that the coolant temperature Tw1 is not lower than the third threshold C° C., the ECU 32 permits operation of the EGR device 44. For example, the third threshold C° C. of the coolant temperature is set between the first threshold B° C. and the second threshold A° C. That is, the third threshold C° C. is set so as to be higher than the first threshold B° C. and lower than the second threshold A° C. For example, when the first threshold B° C. is set to 40° C. and the second threshold A° C. is set to 80° C., the third threshold C° C. is set to 70° C. The third threshold C° C. is set to a somewhat high value in consideration of combustion stability, knocking detectability, and the like.

Figure 5:
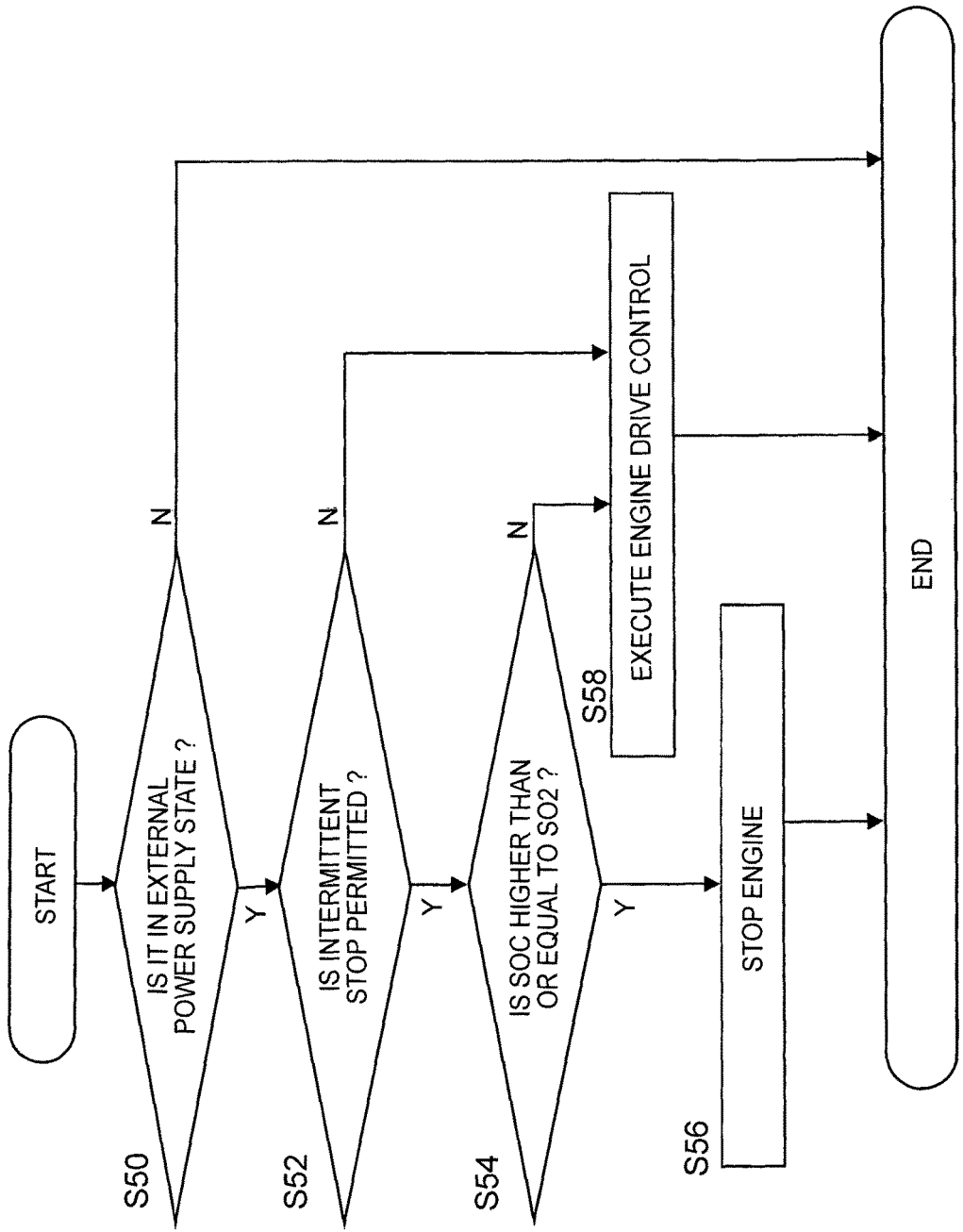
FIG. 5 is a flowchart that shows a control method for the engine when electric power is supplied to the device outside the vehicle in the control system shown in FIG. 1.

FIG. 5 is a flowchart that shows a control method for the engine 20 when electric power is supplied to the device outside the vehicle in the control system 12 shown in FIG. 1. A control routine shown in FIG. 5 is executed by the ECU 32 at predetermined intervals. In step S50, the ECU 32 determines whether it has been shifted into a state where electric power is supplied to the device outside the vehicle through, for example, the routine of the determining method shown in FIG. 4. When the ECU 32 determines in S50 that it has been shifted into a state where electric power is supplied to the device outside the vehicle, the ECU 32 proceeds with the process to S52. The ECU 32 determines in S52 whether the intermittent stop permission condition including the condition that the coolant temperature Tw1 is higher than or equal to the second threshold A° C. is satisfied. When it is determined in S52 that the intermittent stop permission condition is satisfied, the ECU 32 determines in S54 whether the calculated SOC is higher than or equal to the predetermined value SO2. When it is determined in S54 that the calculated SOC is higher than or equal to the predetermined value SO2, the ECU 32 proceeds with the process to S56, and controls the engine 20 such that the engine 20 is stopped.

On the other hand, when it is determined in S52 that the intermittent stop permission condition is not satisfied or when it is determined in S54 that the calculated SOC is not higher than or equal to the predetermined value SO2, the process proceeds to S58, and the ECU 32 executes drive control over the engine 20 such that the engine 20 is driven at a set rotation speed. The drive control over the engine 20 includes both maintaining operation when the engine 20 is being operated and restarting and operating the engine 20 when the engine 20 is stopped. When the ECU 32 determines in S50 that it has not been shifted into a state where electric power is supplied to the device outside the vehicle, the ECU 32 once ends the process.

Figure 6:
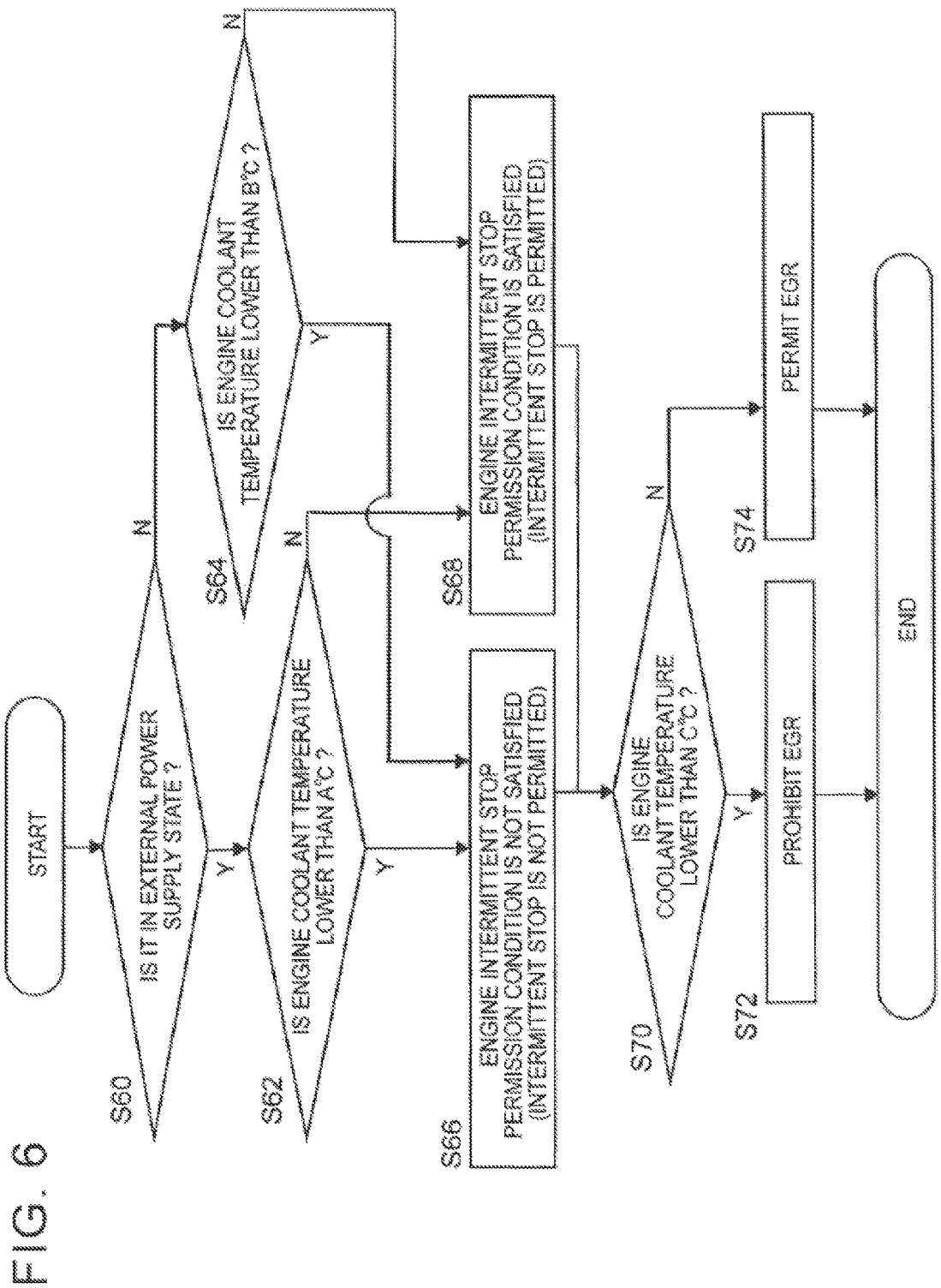
FIG. 6 is a flowchart that shows a method of determining whether an engine intermittent stop permission condition is satisfied and whether operation of an EGR is permitted or prohibited in the control system shown in FIG. 1.

FIG. 6 is a flowchart that shows a method of determining whether the intermittent stop permission condition of the engine 20 is satisfied and whether operation of the EGR device 44 is permitted or prohibited in the control system shown in FIG. 1. A routine of the determining method shown in FIG. 6 is executed by the ECU 32 at predetermined intervals. The ECU 32 determines in S60 whether it is in a state where electric power is supplied to the device outside the vehicle. When it is determined that it is in a state where electric power is supplied to the device outside the vehicle, the process proceeds to S62. In S62, the ECU 32 determines whether the coolant temperature Tw1 is lower than the second threshold A° C. When it is determined that the coolant temperature Tw1 is lower than the second threshold A° C., the ECU 32 determines in S66 that the intermittent stop permission condition is not satisfied and an intermittent stop of the engine 20 is not permitted, and proceeds with the process to S70.

When it is determined in S62 that the coolant temperature Tw1 is higher than or equal to the second threshold A° C., the ECU 32 determines in S68 that the intermittent stop permission condition is satisfied and an intermittent stop of the engine 20 is permitted, and then proceeds with the process to S70.

On the other hand, when it is determined in S60 that it is not in a state where electric power is supplied to the device outside the vehicle, the ECU 32 determines in S64 whether the coolant temperature Tw1 is lower than the first threshold B° C. When it is determined that the coolant temperature Tw1 is lower than the first threshold B° C., the process proceeds to S66, and the ECU 32 determines that an intermittent stop is not permitted.

When it is determined in S64 that the coolant temperature Tw1 is higher than or equal to the first threshold B° C., the process proceeds to S68, and the ECU 32 determines that an intermittent stop is permitted.

In S70, the ECU 32 determines whether the coolant temperature Tw1 is lower than the third threshold C° C. When the ECU 32 determines that the coolant temperature Tw1 is lower than the third threshold C° C., the ECU 32 prohibits operation of the EGR device 44 in S72. On the other hand, when the ECU 32 determines that the coolant temperature Tw1 is higher than or equal to the third threshold C° C., the ECU 32 permits operation of the EGR device 44 in S74.

TABLE 1

| AMBIENT TEMPERATURE (° C.) | K1 | K2 | K3 | K4 |
|---|---|---|---|---|
| A (° C.) | J1 | J2 | J3 | J4 |

(K1 < K2 < K3 < K4, J1 > J2 > J3 > J4)

Table 1 shows the correlation between the second threshold A° C. of the coolant temperature for determining whether the intermittent stop permission condition is satisfied in a state where electric power is supplied to the device outside the vehicle and an ambient temperature. That is, when the ambient temperature is K1° C., J1° C. is set for the second threshold A° C. In Table 1, K1<K2<K3<K4, and J1>J2>J3>J4. As shown in Table 1, the ECU 32 sets the second threshold A° C. such that the second threshold A° C. varies with the ambient temperature, and sets the second threshold A° C. so as to be higher as the ambient temperature decreases. The above correlation is stored in the storage unit of the ECU 32. When a value detected by an ambient temperature sensor (not shown) is input, the ECU 32 changes the second threshold A° C. of the coolant temperature on the basis of the detected value. The reason why the correlation shown in Table 1 is set is to, because the temperature of the engine 20 decreases as the ambient temperature decreases during a stop of the engine 20, keep the temperature of the engine 20 high even when the ambient temperature becomes low by setting the second threshold A° C. to a high value. The second threshold A° C. of the coolant temperature may be set constant irrespective of the ambient temperature.

The vehicle may include a selecting operation unit, such as a selecting switch (not shown), for selecting whether to supply electric power to the device outside the vehicle, and the ECU 32 may receive a signal from the selecting operation unit and determine whether it is in a state where electric power is supplied to the device outside the vehicle.

With the control system 12 and the hybrid vehicle 10 including the control system 12, power of the engine 20 is distributed by the power split mechanism 14 to the output shaft 51 and the first MG 22 when the vehicle is driven to travel. Thus, power at the wheels 18 is generated, and the first MG 22 generates electric power. The second MG 24 is driven by electric power from the battery 28, and outputs the amount of power, which is an insufficient amount of power only by the power of the engine 20 for the vehicle target power. The hybrid vehicle 10 travels with the use of at least one of the engine 20 and the second MG 24 as a drive source.

On the other hand, when the vehicle decelerates, the second MG 24 operates as a generator with the rotation of the wheels 18, and the battery 28 is charged with electric power generated by the second MG 24. When the SOC of the battery 28 is insufficient, the ECU 32 increases the amount of electric power generated by the first MG 22 by increasing the power of the engine 20.

Furthermore, when electric power is supplied to the device outside the vehicle, the engine 20 is operated at a set low speed, different from that during traveling, so the temperature of the engine 20 may be hard to increase. However, the range in which the intermittent stop permission condition is satisfied in the case where electric power is supplied to the device outside the vehicle is set so as to be narrower than the range in which the intermittent stop permission condition is satisfied in the case other than the case where electric power is supplied to the device outside the vehicle, so it is possible to increase the temperature of the engine 20 during a stop of the engine 20 and during operation of the engine 20. Therefore, it is possible to keep the temperature of the engine 20 high even when electric power is supplied to the device outside the vehicle, so it is possible to improve consumption efficiency during engine operation by reducing cooling loss, and it is possible to improve fuel economy performance. When the operation of the EGR device 44 is permitted on the basis of the coolant temperature Tw1 of the engine 20, the EGR device 44 tends to be operated at the time of a restart of the engine 20 even when electric power is supplied to the device outside the vehicle, so fuel economy performance is further improved.

Figure 7:
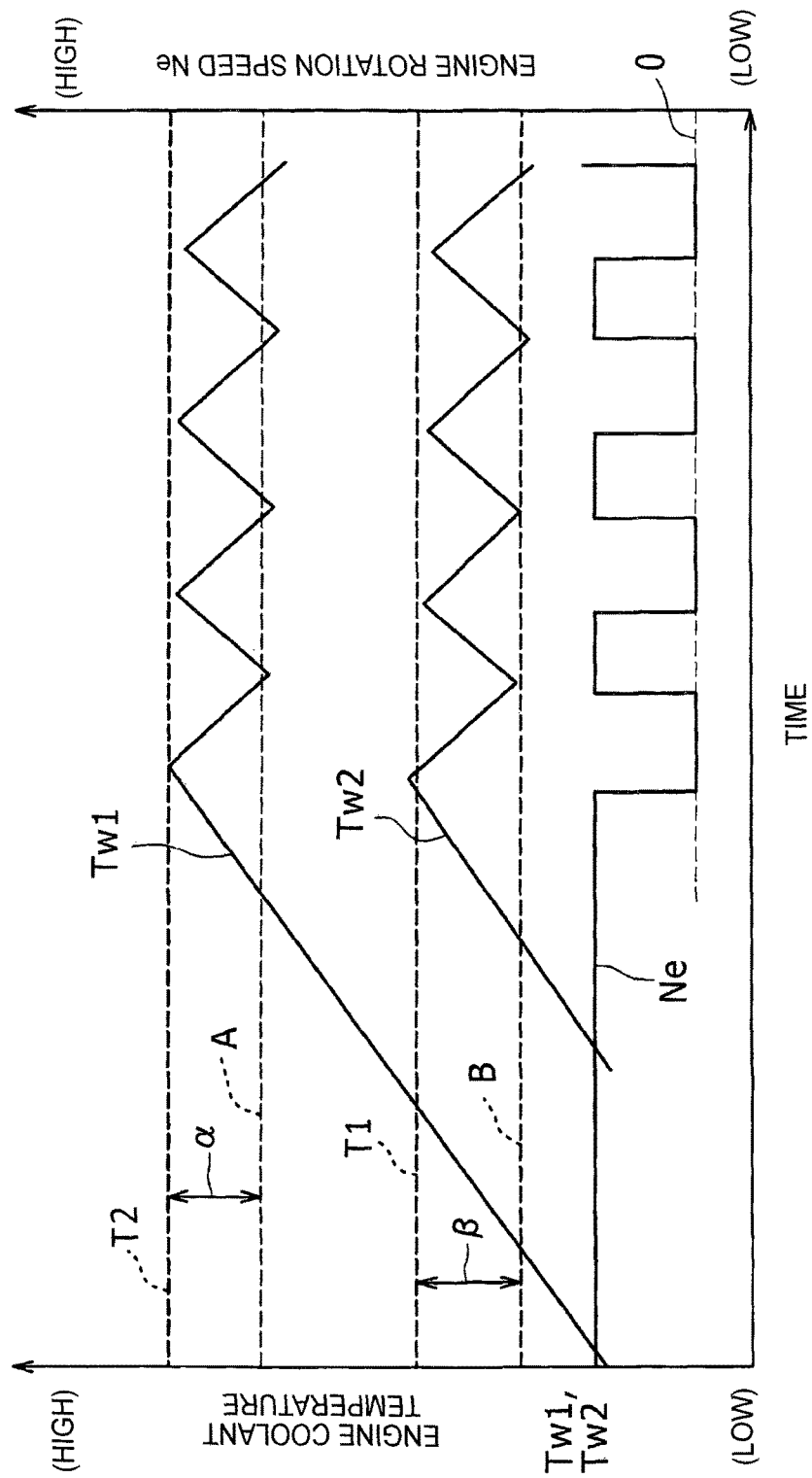
FIG. 7 is a graph that shows an example of temporal changes in engine coolant temperature and engine rotation speed when electric power is supplied to the device outside the vehicle according to the embodiment and a comparative embodiment.

FIG. 7 shows an example of temporal changes in engine coolant temperatures Tw1, Tw2 and engine rotation speed Ne when electric power is supplied to the device outside the vehicle according, to the present embodiment and a comparative embodiment. In the comparative embodiment, the second threshold of the coolant temperature when electric power is supplied to the device outside the vehicle, which is used to determine whether the intermittent stop permission condition is satisfied, is the same as the first threshold B when the vehicle is driven to travel. In the comparative embodiment, the range in which the intermittent stop permission condition is satisfied is also the same between when electric power is supplied to the device outside the vehicle and when the vehicle is driven to travel.

In FIG. 7, Tw1 denotes the coolant temperature according to the present embodiment, and Tw2 denotes the coolant temperature according to the comparative embodiment. In FIG. 7, on the precondition that the intermittent stop permission condition is satisfied at the time of a restart of the engine 20, it is assumed that the engine 20 is stopped when the coolant temperature Tw1 or the coolant temperature Tw2 has increased by a predetermined temperature. When electric power is supplied to the device outside the vehicle according to the present embodiment, the engine 20 is driven in order to drive the first MG 22. At this time, the coolant temperature Tw1 gradually increases first, and the engine 20 stops when the coolant temperature Tw1 is higher than or equal to the second threshold A° C. and becomes a temperature T2 when the SOC has reached the predetermined value SO2. After that, due to a stop of the engine 20, the coolant temperature Tw1 gradually decreases. When the coolant temperature Tw1 decreases and becomes lower than the second threshold A° C., an intermittent stop is not permitted, that is, prohibited, and the engine 20 is driven. Thus, the coolant temperature Tw1 increases again, and, after that, the engine 20 is repeatedly stopped or operated. As a result, as is apparent from fluctuations in the engine rotation speed Ne, intermittent stop operation is carried out within an range indicated by an arrow α in FIG. 7.

On the other hand, the engine 20 is driven when electric power is supplied to the device outside the vehicle even in the comparative embodiment, and the coolant temperature Tw2 increases. In the comparative embodiment, when the coolant temperature Tw2 is higher than or equal to the second threshold B° C. lower than that in the case of the present embodiment and becomes a temperature T1 in the case where the SOC has reached the predetermined value SO1, the engine 20 stops. After that, due to a stop of the engine 20, the coolant temperature Tw2 gradually decreases. When the coolant temperature Tw2 decreases and becomes lower than the second threshold B° C., an intermittent stop is not permitted, and the engine 20 is driven. Thus, the coolant temperature Tw2 increases again, and, after that, the engine 20 is repeatedly stopped or operated. As a result, intermittent stop operation is carried out within a range indicated by an arrow β in FIG. 7. In this way, in the comparative embodiment, an intermittent stop is not permitted at or below the second threshold lower than that in the present embodiment. Here, as described above, the second, threshold of the coolant temperature in the comparative embodiment is the same as the first threshold B° C. Thus, intermittent stop operation is carried out within the lower temperature range. On the other hand, in the present embodiment, an intermittent stop is not permitted below the second threshold A° C. higher than B° C., so intermittent stop operation is carried out at a temperature higher than that in the comparative embodiment. Therefore, combustion efficiency during engine operation is higher than that in the case of the comparative embodiment. FIG. 7 is calculated on the assumption that the coolant temperatures Tw1, Tw2 decrease by the predetermined temperature during intermittent stop; instead, FIG. 7 may be set such that the coolant temperatures Tw1, Tw2 vary with an ambient temperature, an intermittent stop time, or the like.

In the above-described embodiment, the description is made on the case where operation to supply electric power to the device outside the vehicle is operation to transmit electric power to the electrical device 88 that is used in the building as shown in FIG. 3; however, the invention is not limited to this configuration. For example, as shown in FIG. 3, the electrical device 90 outside the vehicle, which is used outdoors is connected to an adapter 116 via a plug 114, and the plug 100 of the power cable 68 is connected to the adapter 116. Thus, it is possible to supply power from the vehicle to the electrical device 90 outside the vehicle. For example, the hybrid vehicle 10 may be used as an emergency power supply at the time of a disaster, such as an earthquake.

The embodiment of the invention is described above; however, the invention is not limited to the above-described embodiment. Of course, the invention may be implemented in various forms without departing from the scope of the invention.

The invention claimed is:

1. A control system for a vehicle that includes an engine, an electrical storage unit and a generator driven by the engine, the control system comprising:
   a socket configured to supply electric power from the generator or the electrical storage unit to a device outside the vehicle in a travel stop state, and
   an electronic control unit configured to stop the engine when a preset condition is satisfied,
   the electronic control unit being configured such that when electric power is supplied to the device outside the vehicle, the preset condition is satisfied when a coolant temperature is in a first range,
   the electronic control unit being configured such that when electric power is not supplied to the device outside the vehicle, the preset condition is satisfied when the coolant temperature is in a second range, and
   the electronic control unit being configured to set the first range and the second range wherein the first range is narrower than the second range,
   wherein when electric power is not supplied to the device outside the vehicle, the preset condition is satisfied when the coolant temperature is higher than or equal to a first threshold, and
   wherein when electric power is not supplied to the device outside the vehicle, the preset condition is not satisfied when the coolant temperature is lower than the first threshold.

2. The control system according to claim 1, wherein when electric power is supplied to the device outside the vehicle, the preset condition is satisfied when the coolant temperature is higher than or equal to a second threshold that is set so as to be higher than the first threshold, and
   wherein when electric power is supplied to the device outside the vehicle, the preset condition is not satisfied when the coolant temperature is lower than the second threshold.

3. The control system according to claim 2, wherein the electronic control unit is configured to prohibit operation of an exhaust gas recirculation device when the coolant temperature is lower than a third threshold.

4. The control system according to claim 3, wherein the third threshold is higher than the first threshold and lower than the second threshold.

5. The control system according to claim 1, wherein the electronic control unit is configured to prohibit operation of an exhaust gas recirculation device when the coolant temperature is lower than a third threshold.

6. A vehicle comprising:
   an engine;
   an electrical storage unit;
   a generator configured to be driven by the engine;
   a socket configured to supply electric power from the generator or the electrical storage unit to a device outside the vehicle in a travel stop state; and
   an electronic control unit configured to stop the engine when a preset condition is satisfied,
   the electronic control unit being configured such that when electric power is supplied to the device outside the vehicle, the preset condition is satisfied when a coolant temperature is in a first range,
   the electronic control unit being configured such that when electric power is not supplied to the device outside the vehicle, the preset condition is satisfied when the coolant temperature is in a second range, and
   the electronic control unit being configured to set the first range and the second range wherein the first range is narrower than the second range,
   wherein when electric power is not supplied to the device outside the vehicle, the preset condition is satisfied when the coolant temperature is higher than or equal to a first threshold, and
   wherein when electric power is not supplied to the device outside the vehicle, the preset condition is not satisfied when the coolant temperature is lower than the first threshold.

7. A control method for a vehicle, the vehicle including an engine, a generator, an electrical storage unit, a socket and an electronic control unit,
   the control method comprising:
   supplying, by the socket, electric power from the generator or the electrical storage unit to a device outside the vehicle when the vehicle is in a travel stop state;
   stopping, by the electronic control unit, the engine when a preset condition is satisfied; and
   setting, by the electronic control unit, a first range and a second range,
   wherein when electric power is supplied to the device outside the vehicle, the preset condition is satisfied when a coolant temperature is in the first range,
   wherein when electric power is not supplied to the device outside the vehicle, the preset condition is satisfied when the coolant temperature is in the second range, the first range being narrower than the second range,
   wherein when electric power is not supplied to the device outside the vehicle, the preset condition is satisfied when the coolant temperature is higher than or equal to a first threshold, and
   wherein when electric power is not supplied to the device outside the vehicle, the preset condition is not satisfied when the coolant temperature is lower than the first threshold.

* * * * *